US012123731B2

(12) United States Patent
Goel

(10) Patent No.: US 12,123,731 B2
(45) Date of Patent: *Oct. 22, 2024

(54) SYSTEM AND METHOD FOR STORING AND PROVIDING ROUTES

(71) Applicant: Google LLC, Mountain View, CA (US)

(72) Inventor: Vinay Goel, Bangalore (IN)

(73) Assignee: Google LLC, Mountain View, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/590,261

(22) Filed: Feb. 1, 2022

(65) Prior Publication Data
US 2022/0155084 A1 May 19, 2022

Related U.S. Application Data

(63) Continuation of application No. 16/274,667, filed on Feb. 13, 2019, now Pat. No. 11,243,088, which is a continuation of application No. 15/438,829, filed on Feb. 22, 2017, now Pat. No. 10,247,563, which is a continuation of application No. 14/271,831, filed on May 7, 2014, now Pat. No. 9,612,125, which is a continuation of application No. 13/861,558, filed on Apr. 12, 2013, now Pat. No. 8,762,058, which is a continuation of application No. 13/479,443, filed on May 24, 2012, now Pat. No. 8,433,513, which is a
(Continued)

(51) Int. Cl.
*G01C 21/34* (2006.01)
*H04W 4/02* (2018.01)
*H04W 4/024* (2018.01)

(52) U.S. Cl.
CPC ......... *G01C 21/3484* (2013.01); *G01C 21/34* (2013.01); *G01C 21/3476* (2013.01); *G01C 21/3492* (2013.01); *H04W 4/02* (2013.01); *H04W 4/024* (2018.02)

(58) Field of Classification Search
CPC ............... G01C 21/3484; G01C 21/34; G01C 21/3476; G01C 21/3492; H04W 4/02; H04W 4/024
See application file for complete search history.

(56) References Cited

U.S. PATENT DOCUMENTS 4,926,336 A * 5/1990 Yamada ............. G01C 21/3461
701/428
4,937,753 A * 6/1990 Yamada ............. G01C 21/3446
701/430
(Continued)

FOREIGN PATENT DOCUMENTS

JP          2003315075 A  *  11/2003
JP          3965071 B2    *   8/2007
(Continued)

OTHER PUBLICATIONS

Translated copy of JP 2003315075 of Takenaka T, Nov. 6, 2003.*
(Continued)

*Primary Examiner* — Bhavesh V Amin
(74) *Attorney, Agent, or Firm* — Lerner David LLP

(57) ABSTRACT

In one aspect, a system and method is provided whereby map-related requests from mobile devices are used to store and aggregate routes. The routes are then used to determine optimum directions in response to subsequent requests.

19 Claims, 9 Drawing Sheets

Related U.S. Application Data continuation of application No. 12/291,852, filed on Nov. 14, 2008, now Pat. No. 8,219,316.

(56) References Cited

U.S. PATENT DOCUMENTS

| | | | |
|---|---|---|---|
| 5,031,104 A * | 7/1991 | Ikeda | G01C 21/367 |
| | | | 701/428 |
| 5,220,507 A * | 6/1993 | Kirson | G01C 21/3484 |
| | | | 701/429 |
| 5,467,276 A * | 11/1995 | Tsuyuki | G01C 21/3407 |
| | | | 701/410 |
| 5,475,598 A * | 12/1995 | Fushimi | G01C 21/34 |
| | | | 340/995.23 |
| 5,521,826 A * | 5/1996 | Matsumoto | G01C 21/3446 |
| | | | 701/425 |
| 5,675,492 A * | 10/1997 | Tsuyuki | G08G 1/096838 |
| | | | 73/178 R |
| 5,739,772 A | 4/1998 | Nanba et al. | |
| 5,748,109 A * | 5/1998 | Kosaka | G08G 1/0969 |
| | | | 340/995.14 |
| 5,774,073 A * | 6/1998 | Maekawa | G01C 21/3415 |
| | | | 701/410 |
| 5,845,228 A * | 12/1998 | Uekawa | G01C 21/3446 |
| | | | 701/410 |
| 5,878,368 A * | 3/1999 | DeGraaf | G08G 1/096861 |
| | | | 73/178 R |
| 5,931,888 A * | 8/1999 | Hiyokawa | G08G 1/096838 |
| | | | 701/428 |
| 5,933,100 A | 8/1999 | Golding | |
| 5,938,720 A | 8/1999 | Tamai | |
| 5,948,040 A * | 9/1999 | DeLorme | G06Q 10/02 |
| | | | 701/426 |
| 5,982,298 A * | 11/1999 | Lappenbusch | G08G 1/0969 |
| | | | 340/995.13 |
| 6,014,607 A * | 1/2000 | Yagyu | G01C 21/3446 |
| | | | 701/410 |
| 6,038,509 A | 3/2000 | Poppen et al. | |
| 6,073,075 A | 6/2000 | Kondou et al. | |
| 6,119,095 A * | 9/2000 | Morita | G06Q 10/02 |
| | | | 705/5 |
| 6,150,961 A | 11/2000 | Alewine et al. | |
| 6,208,934 B1 | 3/2001 | Bechtolsheim et al. | |
| 6,212,473 B1 * | 4/2001 | Stefan | G01C 21/3484 |
| | | | 701/425 |
| 6,216,086 B1 * | 4/2001 | Seymour | G01C 21/3446 |
| | | | 701/425 |
| 6,236,933 B1 | 5/2001 | Lang | |
| 6,249,742 B1 | 6/2001 | Friederich et al. | |
| 6,266,615 B1 * | 7/2001 | Jin | G08G 1/096883 |
| | | | 701/488 |
| 6,317,685 B1 * | 11/2001 | Kozak | G06Q 10/047 |
| | | | 340/905 |
| 6,321,158 B1 * | 11/2001 | DeLorme | G06Q 10/047 |
| | | | 701/426 |
| 6,353,795 B1 | 3/2002 | Ranjan | |
| 6,381,539 B1 * | 4/2002 | Shimazu | G01C 21/26 |
| | | | 340/990 |
| 6,385,535 B2 * | 5/2002 | Ohishi | G01C 21/36 |
| | | | 701/425 |
| 6,415,224 B1 | 7/2002 | Wako et al. | |
| 6,434,482 B1 | 8/2002 | Oshida et al. | |
| 6,480,783 B1 * | 11/2002 | Myr | G08G 1/096838 |
| | | | 340/990 |
| 6,505,118 B2 * | 1/2003 | Chowanic | G01C 21/3484 |
| | | | 701/25 |
| 6,529,143 B2 | 3/2003 | Mikkola et al. | |
| 6,553,308 B1 * | 4/2003 | Uhlmann | G08G 1/09681 |
| | | | 340/988 |
| 6,567,743 B1 * | 5/2003 | Mueller | G06Q 10/047 |
| | | | 701/533 |
| 6,587,782 B1 * | 7/2003 | Nocek | G01C 21/3682 |
| | | | 701/438 |
| 6,611,750 B2 | 8/2003 | MacPhail et al. | |
| 6,629,034 B1 * | 9/2003 | Kozak | G06Q 50/188 |
| | | | 73/178 R |
| 6,691,128 B2 | 2/2004 | Natesan et al. | |
| 6,721,651 B1 | 4/2004 | Minelli | |
| 6,766,174 B1 | 7/2004 | Kenyon | |
| 6,795,769 B2 * | 9/2004 | Kaji | G01C 21/3492 |
| | | | 701/428 |
| 6,804,603 B2 * | 10/2004 | Ukita | G01C 21/3626 |
| | | | 73/178 R |
| 6,807,483 B1 * | 10/2004 | Chao | G01C 21/3492 |
| | | | 340/995.23 |
| 6,816,778 B2 * | 11/2004 | Diaz | G08G 1/0962 |
| | | | 73/178 R |
| 6,859,723 B2 | 2/2005 | Yokota | |
| 6,862,524 B1 * | 3/2005 | Nagda | G08G 1/096816 |
| | | | 340/995.13 |
| 7,082,365 B2 * | 7/2006 | Sheha | H04W 4/02 |
| | | | 701/426 |
| 7,127,350 B2 | 10/2006 | Oikubo | |
| 7,233,861 B2 | 6/2007 | Van Buer et al. | |
| 7,257,484 B2 * | 8/2007 | Park | G01C 21/3484 |
| | | | 701/25 |
| 7,321,826 B2 * | 1/2008 | Sheha | G08G 1/0962 |
| | | | 701/426 |
| 7,383,126 B2 | 6/2008 | Takahashi | |
| 7,389,285 B2 * | 6/2008 | Barry | G06Q 30/02 |
| | | | 707/999.102 |
| 7,400,973 B2 * | 7/2008 | Okochi | G01C 21/3484 |
| | | | 340/995.19 |
| 7,480,567 B2 * | 1/2009 | Suomela | H04M 1/72457 |
| | | | 701/428 |
| 7,502,685 B2 | 3/2009 | Nakamura | |
| 7,525,416 B2 | 4/2009 | Mader | |
| 7,546,205 B2 * | 6/2009 | Sumizawa | G01C 21/34 |
| | | | 340/995.14 |
| 7,565,155 B2 | 7/2009 | Sheha et al. | |
| 7,693,652 B2 | 4/2010 | Cheung | |
| 7,698,061 B2 * | 4/2010 | Singh | G01C 21/3484 |
| | | | 348/211.3 |
| 7,711,478 B2 | 5/2010 | Gluck | |
| 7,805,241 B2 * | 9/2010 | Sato | G08G 1/096758 |
| | | | 340/991 |
| 7,817,085 B2 | 10/2010 | Harris | |
| 7,826,965 B2 * | 11/2010 | Sadri | G01C 21/20 |
| | | | 701/527 |
| 7,865,298 B2 * | 1/2011 | Macneille | G01C 21/3469 |
| | | | 701/123 |
| 7,869,946 B2 | 1/2011 | Couckuyt et al. | |
| 7,881,864 B2 | 2/2011 | Smith | |
| 7,945,383 B2 | 5/2011 | Tu et al. | |
| 7,957,895 B2 * | 6/2011 | Haase | G01C 21/3679 |
| | | | 707/999.102 |
| 8,010,285 B1 * | 8/2011 | Denise | G01C 21/3415 |
| | | | 701/417 |
| 8,019,581 B2 | 9/2011 | Sheha et al. | |
| 8,073,621 B2 * | 12/2011 | Kim | G08G 1/096827 |
| | | | 701/423 |
| 8,090,534 B2 | 1/2012 | Sheha et al. | |
| 8,108,141 B2 * | 1/2012 | Ehrlacher | G08G 1/096855 |
| | | | 701/422 |
| 8,175,802 B2 * | 5/2012 | Forstall | G01C 21/3484 |
| | | | 701/424 |
| 8,346,465 B2 * | 1/2013 | Panganiban | G01C 21/3673 |
| | | | 701/457 |
| 8,606,511 B2 * | 12/2013 | Johnson | G01C 21/3461 |
| | | | 340/988 |
| 8,620,532 B2 | 12/2013 | Curtis et al. | |
| 8,718,910 B2 * | 5/2014 | Gueziec | G08G 1/0141 |
| | | | 701/119 |
| 9,026,353 B2 * | 5/2015 | Tashiro | G01C 21/3658 |
| | | | 701/400 |
| 9,250,094 B2 * | 2/2016 | Victor | G01C 21/3655 |
| 9,612,125 B2 * | 4/2017 | Goel | H04W 4/024 |
| 9,869,563 B2 * | 1/2018 | Broadbent | G01C 21/3667 |
| 11,361,361 B2 * | 6/2022 | Malewicz | G06Q 30/0629 |
| 2001/0029425 A1 | 10/2001 | Myr | |

(56) References Cited

U.S. PATENT DOCUMENTS

| | | | |
|---|---|---|---|
| 2001/0037174 A1 | 11/2001 | Dickerson | |
| 2002/0047787 A1 | 4/2002 | Mikkola et al. | |
| 2002/0067379 A1 | 6/2002 | Kenyon et al. | |
| 2002/0120396 A1 | 8/2002 | Boies et al. | |
| 2002/0128766 A1 | 9/2002 | Petzold et al. | |
| 2002/0128773 A1* | 9/2002 | Chowanic | G01C 21/3484 701/414 |
| 2002/0156572 A1* | 10/2002 | Bullock | G01C 21/3484 340/988 |
| 2002/0161517 A1* | 10/2002 | Yano | G08G 1/096872 340/990 |
| 2003/0036848 A1* | 2/2003 | Sheha | H04W 4/02 340/990 |
| 2003/0060976 A1* | 3/2003 | Sato | G08G 1/096872 340/988 |
| 2003/0182052 A1 | 9/2003 | DeLorme et al. | |
| 2004/0008225 A1 | 1/2004 | Campbell | |
| 2004/0128066 A1* | 7/2004 | Kudo | G01C 21/3617 340/995.17 |
| 2004/0204833 A1* | 10/2004 | Yokota | G08G 1/096894 340/995.16 |
| 2004/0220726 A1* | 11/2004 | Jin | G08G 1/096838 340/995.12 |
| 2004/0225436 A1* | 11/2004 | Yoshihashi | G01C 21/20 340/995.14 |
| 2005/0027447 A1 | 2/2005 | Hirose et al. | |
| 2005/0027448 A1* | 2/2005 | Takenaga | G08G 1/09675 340/995.13 |
| 2005/0075119 A1* | 4/2005 | Sheha | G01C 21/3676 455/456.6 |
| 2005/0125148 A1* | 6/2005 | Van Buer | G01C 21/3617 340/995.19 |
| 2005/0140524 A1* | 6/2005 | Kato | G08G 1/096844 340/995.13 |
| 2005/0165832 A1* | 7/2005 | Adam Barry | G06Q 30/02 |
| 2005/0261825 A1* | 11/2005 | Nix | G01C 21/3632 701/410 |
| 2005/0261830 A1* | 11/2005 | Furukawa | G01C 21/367 701/455 |
| 2005/0273252 A1* | 12/2005 | Nix | G01C 21/3632 340/995.16 |
| 2006/0021815 A1 | 2/2006 | Ohtaka | |
| 2006/0105795 A1 | 5/2006 | Cermak et al. | |
| 2006/0184314 A1 | 8/2006 | Couckuyt et al. | |
| 2006/0241854 A1* | 10/2006 | Tu | G01C 21/3446 340/995.19 |
| 2007/0016368 A1* | 1/2007 | Chapin | G01C 21/3644 701/426 |
| 2007/0208492 A1* | 9/2007 | Downs | G08G 1/0104 701/117 |
| 2007/0219706 A1* | 9/2007 | Sheynblat | G01C 21/3679 701/532 |
| 2007/0233384 A1* | 10/2007 | Lee | G06Q 10/047 701/469 |
| 2007/0239348 A1* | 10/2007 | Cheung | G01C 21/3423 701/467 |
| 2007/0239349 A1* | 10/2007 | Ohnishi | G06Q 10/047 701/410 |
| 2008/0048856 A1 | 2/2008 | Culpepper et al. | |
| 2008/0059055 A1* | 3/2008 | Geelen | G01C 21/26 701/533 |
| 2008/0275644 A1* | 11/2008 | Macneille | B60W 10/26 701/414 |
| 2009/0005965 A1* | 1/2009 | Forstall | G01C 21/3484 701/533 |
| 2009/0112462 A1* | 4/2009 | Lo | G01C 21/3632 701/533 |
| 2009/0222200 A1* | 9/2009 | Link, II | G01C 21/3896 701/533 |
| 2009/0292463 A1* | 11/2009 | Chase | G01C 21/343 701/533 |
| 2010/0057336 A1* | 3/2010 | Levine | G01C 21/3815 701/532 |
| 2011/0037619 A1* | 2/2011 | Ginsberg | G08G 1/095 340/910 |
| 2011/0153193 A1 | 6/2011 | Fox et al. | |
| 2013/0096829 A1* | 4/2013 | Kato | G01C 21/3859 701/533 |
| 2013/0166205 A1* | 6/2013 | Ikeda | G01C 21/3815 701/533 |
| 2016/0341562 A1* | 11/2016 | Samsonov | G01C 21/3815 |
| 2017/0176201 A1* | 6/2017 | Goel | G01C 21/34 |

FOREIGN PATENT DOCUMENTS

| | | |
|---|---|---|
| WO | 2006073997 | 7/2006 |
| WO | 2007008809 A2 | 1/2007 |

OTHER PUBLICATIONS

Translated copy of JP 3965071 B2 of Takenaka T, Aug. 22, 2003.*
Lorraine McGinty and Barry Smyth, "Personalised Route Planning: a Case-Based Approach", E. Blanzieri and L. Portinale (Eds.): EWCBR 2000, LNAI 1898, pp. 431-443, 2000.
Routeguru, "Routeguru.com; How it works and what it offers?", <http://themarketingblog.wordpress.com/2007/05/28/routegurucom/>, 2007, 8 pages.
"Driving directions launched by Yahoo—an analysis", <http://silicontryst.wordpress.com/2007/10/27/driving-direction-launch-by-yahoo-an-analysis/>, Printed on Sep. 24, 2009, 5 pages.
Travelogue, "Indian Maps with Driving Directions", <http://travelogue.blogsailor.com/indian-maps-with-driving-directions/>, Posted on Oct. 29, 2007, 6 pages.
Jon Froehlich, John Krumm, Route Prediction From Trip Observations, 2008 SAE International, 2008.
Julia Letchner, John Krumm, Eric Horvitz, Trip Router With Individualized Preferences (TRIP) Incorporating Personalization into Route Planning, 2006.
Stefan Schroedl, Kiri Wagstafff, Seth Rogers, Pat Langley, Christopher Wilson, Mining GPS for Map Refinement, 2004.
Humbad, "Suitability of Distributed Mobile Wireless Networking for Urban Traffic Congestion Mitigation", Masters' Thesis, Massachusetts Institute of Technology, Published Jun. 2001.
PCT Notification of Transmittal of the International Search Report and the Written Opinion of the International Searching Authority, or the Declaration for PCT/US 09/64311, Jan. 13, 2010, 9 pages.
First Examination Report for Indian Patent Application No. 3981/CHENP/2011, dated Jul. 13, 2017. 4 pages.
Hearing Notice for Indian Patent Application No. 3981/CHENP/2011 dated Feb. 24, 2020. 4 pages.

* cited by examiner

| Longitude / Latitude | Time | UID |
|---|---|---|
| 16° 57' 33.24" N, 73° 50' 41.19" E | 12:00:05 pm | 13549234 |
| 16° 57' 33.97" N, 73° 50' 41.10" E | 12:00:08 pm | 13549234 |
| 16° 57' 34.50" N, 73° 50' 41.35" E | 12:00:15 pm | 13549234 |
| ... | ... | ... |

FIGURE 3

SYSTEM AND METHOD FOR STORING AND PROVIDING ROUTES

CROSS-REFERENCE TO RELATED APPLICATIONS

The present application is a continuation of U.S. patent application Ser. No. 16/274,667 filed on Feb. 13, 2019, which is a continuation of U.S. patent application Ser. No. 15/438,829 filed on Feb. 22, 2017 which is a continuation of U.S. patent application Ser. No. 14/271,831 filed on May 7, 2014, now U.S. Pat. No. 9,612,125, which is a continuation of U.S. patent application Ser. No. 13/861,558 filed on Apr. 12, 2013, now U.S. Pat. No. 8,762,058, which is a continuation of U.S. patent application Ser. No. 13/479,443, filed on May 24, 2012, now U.S. Pat. No. 8,433,513, which is a continuation of U.S. patent application Ser. No. 12/291,852, filed on Nov. 14, 2008, now U.S. Pat. No. 8,219,316, the disclosures of which are incorporated herein by reference.

BACKGROUND OF THE INVENTION

Systems and methods that provide map-based directions for mobile devices and other computers are well known. For example, Google Maps for Mobile allows mobile devices, such as cell phones and PDAs, to display maps and text-based directions in response to user requests.

Some software, including Google Maps for Mobile, also allows users to display their progress relative to a map in real time. For example, if a mobile device is able to determine its geographic location, the device may download or otherwise access maps corresponding with its location and then display its location on the map. Mobile devices typically calculate their position via an internal or external GPS component, or by calculating their position relative to one or more cell phone towers.

Relatively complete and accurate maps are available with respect to many parts of the world. However, in many other areas of the world, the map data is incomplete and sometimes even incorrect, particularly when it comes to undeveloped or rapidly-developing areas. For example, a map database may not reflect the fact that a road has been recently built, closed or rerouted. Moreover, the database may be aware that a road is present, but it may not store the street name. Some streets will not even have a name.

One method of coping with the problem of incomplete maps is for mapping companies to retain people who drive around with GPS devices, manually detect road changes and enter new roads into the database. In addition to being relatively expensive, such a method of uploading data to a map database has other disadvantages as well.

BRIEF SUMMARY OF THE INVENTION

One aspect of the invention comprises a method of providing directions, and includes: receiving a request for map information from a plurality of mobile devices as the mobile devices travel along a route, the request identifying the geographical location of a mobile device as it changes over time; storing the route traveled by each of the mobile devices based on the changing geographical locations received from each device; transmitting map information to the mobile devices in response to the request for map information and based on the geographical locations associated with the request; receiving, from a user, a request for directions from a starting location to an ending location; and providing directions to the user based on a stored route, the starting location and the ending location.

Another aspect of the invention relates to providing directions to end user computers. This aspect includes a plurality of mobile devices, where each mobile device includes a component to determine the geographic location of the device. The aspect also includes a computer in communication with the plurality of mobile devices, where the computer includes a processor and instructions executable by the processor. The instructions comprise: receiving and storing a set of geographic locations periodically received from each mobile device; receiving a request for a route between a starting point and ending point; selecting the route based on either (a) a set containing locations at or near the starting and ending point and locations there between or (b) a set containing locations at or near the starting and ending point and locations there between by joining the sets received from a plurality of mobile devices. The aspect further includes a plurality of end user computers, in communication with the computer over a network, that provide the requests for routes to the computer and receive the routes in response.

Yet another aspect of the invention provides a receiving directions. The method includes sending a request of directions from an end user computer to a server where the request identifies a first point-of-interest (POI) and a second POI. It also includes receiving, from the server and in response to the request, directions between the first POI and second POI where the directions were determined by the server by: selecting a route from a plurality of routes stored in a database; each route comprising a route traveled by a mobile device; the selected route identifying a route between the first POI and the second POI, and; the directions corresponding with the selected route.

Still another aspect of the invention relates to a method of changing map information. In this aspect, a plurality of requests for map information are removed from a plurality of computers, each request identifying the location of the computer and where the location changes over time and the map information including information identifying streets. The map information is provided in response to the request, and the map information is changed if the locations received from the computers do not correspond with information identifying streets.

A further aspect of the invention relates to a method of selecting a route between a first point and a second point. It includes: receiving route information from a first plurality of mobile devices as the mobile devices travel along a first route, the route information identifying the route traveled by the devices; receiving route information from a second plurality of mobile devices as the mobile devices travel along a second route; a first point being the same on both the first and second route, a second point being the same on both the first and second route, but the first and second routes otherwise being different between the first and second route; receiving a request from a user for directions between the first point and second point; selecting the portion of the first route between the first and second points if the received route information identifies a larger number of mobile devices traveling the first route than the second route; selecting the portion of the second route between the first and second points if the received route information identifies a larger number of mobile devices traveling the second route than the first route; and transmitting the selected route to the user.

BRIEF DESCRIPTION OF THE DRAWINGS

FIG. 3 is an example of a table of route data in accordance with an aspect of the invention.

DETAILED DESCRIPTION

In one aspect, the system and method uses prior map-related requests to provide future directions. By way of example only, the system and method stores routes traveled by moving mobile devices. The routes may be received in connection with the device's request for maps. When the system and method receives a request for directions, it selects the route or routes, or portions thereof, that corresponds with the desired starting and ending point. The system and method may also provide the directions, where possible, relative to landmarks or other points of interest rather than street names. The system and method may further use the route information to update its map database.

Figure 1:
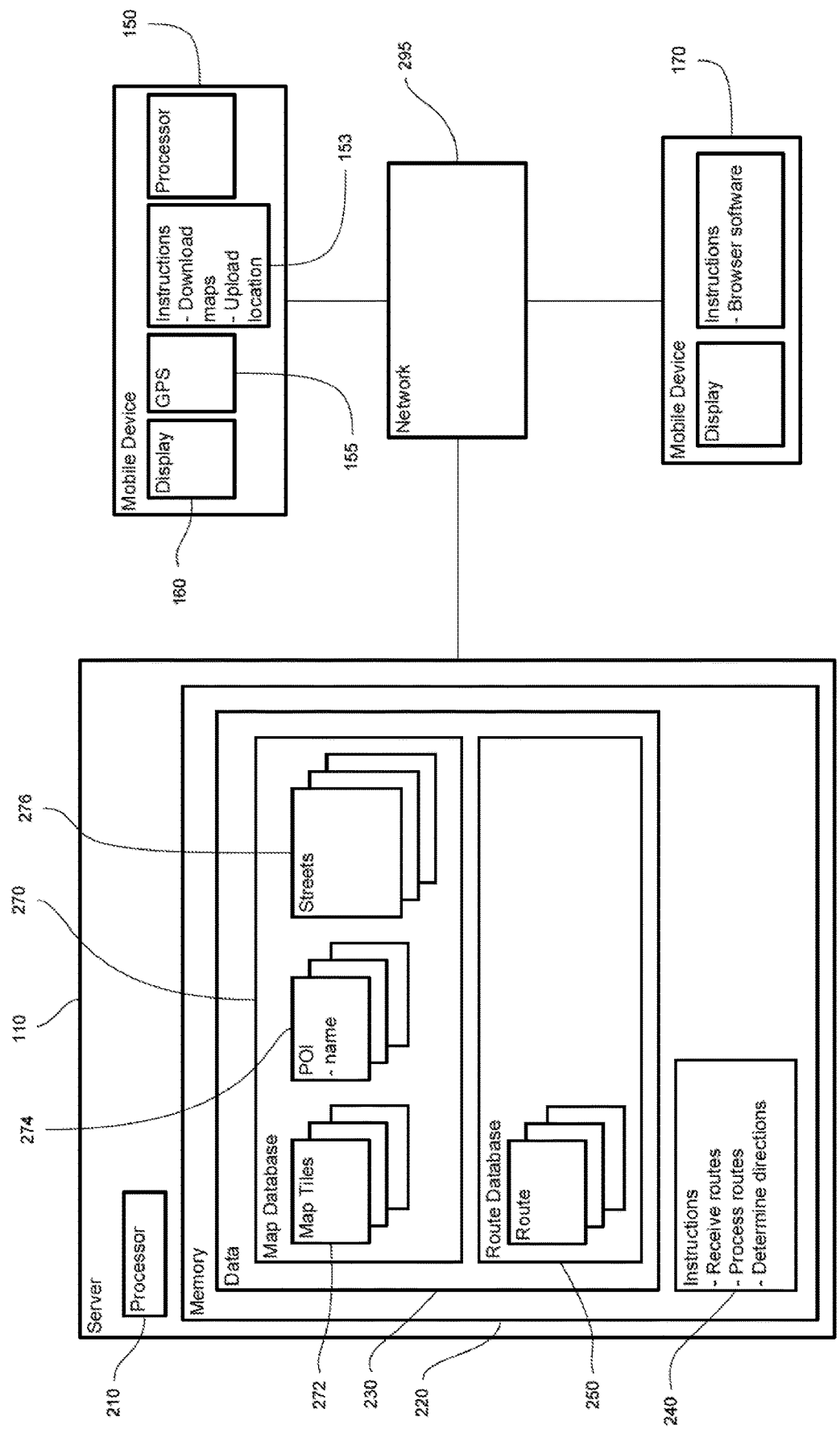
FIG. 1 is a functional diagram of a system in accordance with an aspect of the invention.
Figure 2:
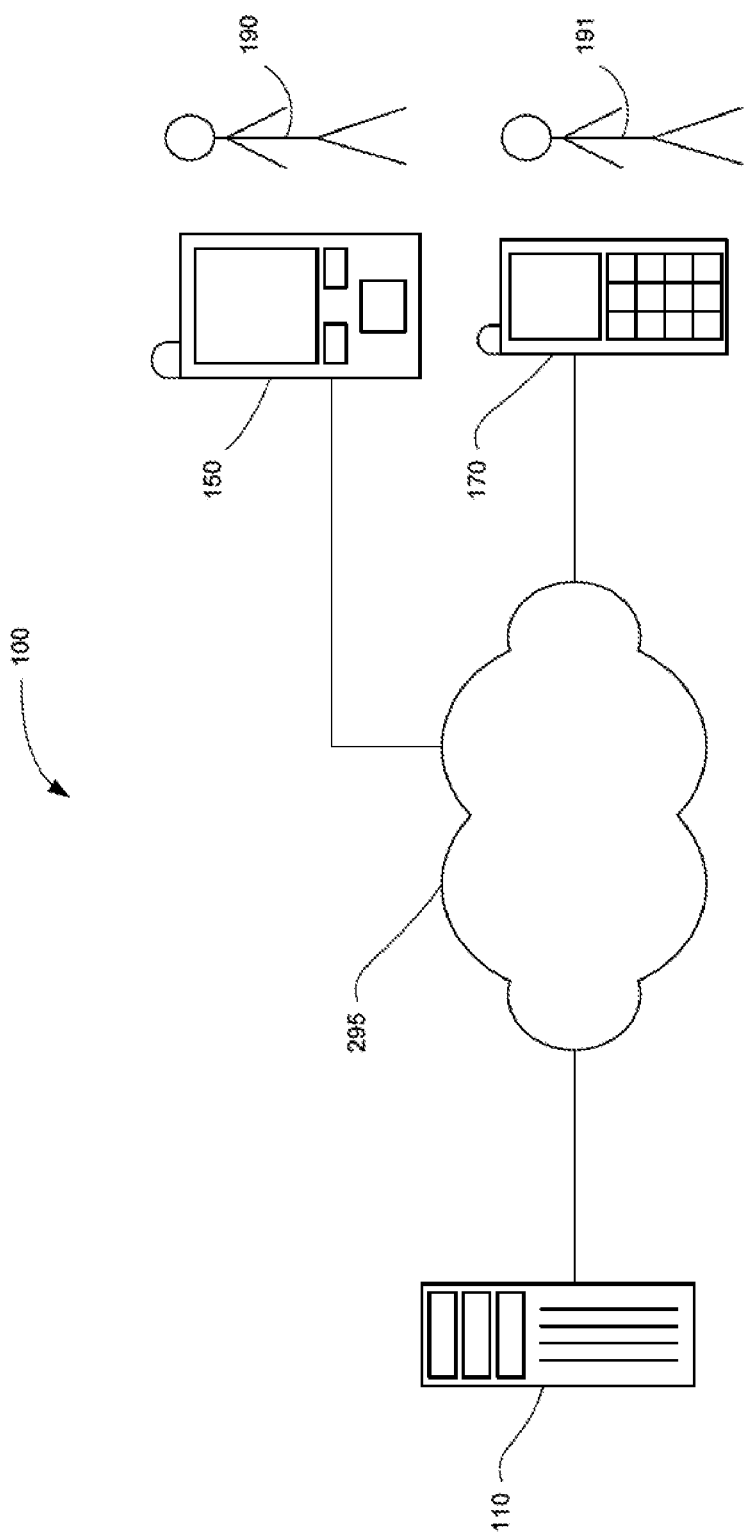
FIG. 2 is a pictorial functional diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories.

The processor may be any well-known processor, such as processors from Intel Corporation. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions also function as an algorithm allowing the processor to perform the purposes intended by the instructions. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the invention is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 150, 170. Each client computer may be configured similarly to the server 110, with a processor, memory and instructions. Each client computer 150, 171 may be a personal computer, intended for use by a person 190-191, having all the internal components normally found in a personal computer such as a central processing unit (CPU), display 160, CD-ROM, hard-drive, user input (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers and network computers lacking local storage capability.

The server 110 and client computers 150, 171 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. Server 110 may be a web server.

Although certain advantages are obtained when information is transmitted or received as noted above, other aspects of the invention are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the invention may be implemented by a single computer having a single processor.

Although the client computers 150 and 170 may comprise various devices as noted above and transmission of data may occur in many different ways, certain advantages are achieved when at least one of the devices is a mobile device capable of wirelessly exchanging data with a network such as the Internet. For example, mobile device 150 may comprise a wireless-enabled PDA such as a Blackberry, and mobile device 151 may comprise an Internet-capable cellular phone.

Mobile devices 150 and 170 may include a component, such as circuits, to determine the geographic location of the device. For example, mobile device 150 may include a GPS receiver 155. By way of further example, the component may include software for determining the position of the device based on signals received at a cell phone's antenna from one or more cell phone towers, particularly if the mobile device is cell phone.

In accordance with one aspect of the system and method, mobile device 150 includes a routine for periodically uploading its geographic location to server 110. Its instructions 153 may also include a routine for requesting and downloading maps and directions. Examples of such routines are explained in more detail below. Both routines may be present in a single application, such as Google Maps for Mobile. Alternatively, the routines may be provided in different applications. For example, the software for downloading and displaying a map and directions may comprise a generic Internet browser that downloads HTML containing maps. The software for uploading data, on the other hand, may comprise a separate dedicated application created for the sole purpose of uploading location information to the server.

Server 110 may include various instructions and databases to be used in connection with client devices 150, 170.

Map database 270 stores map-related information, at least a portion of which may be transmitted to a client device. For example, map database 270 may store map tiles 272, where each tile is an image of particular geographic area. Depending on the resolution (e.g., whether the map is zoomed in or out), a single tile may cover an entire state in relatively little detail or just a few streets in high detail.

The map database may also include points of interest (POI) 274. A point of interest may be any item that is both interesting to one or more users and associated with a geographical location. For example, a point of interest may be a landmark, stadium or building. A point of interest typically includes a name, such as "Civic Center". POI may be added to the database by professional map providers, individual users or other entities.

Map database 270 also stores streets 276. In addition to the street images in the tiles 272, the street information 276 stores information regarding the location of a street relative to a geographic area and other streets. For example, it may store information indicating whether a driver may access one street directly from another street. Street information 276 further stores streets names where available, and potentially other information as well such as the distance between intersections and speed limits. All or some of the foregoing information is used by processor 210 to compute the optimal route between locations.

Route database 250 stores routes as explained in more detail below.

It will be understood that the foregoing information described as being contained in the map database 270 is by way of example only. It will be further understood databases 250 and 270 may actually comprise a single database or many different databases located in different servers in different locations.

Figure 9:
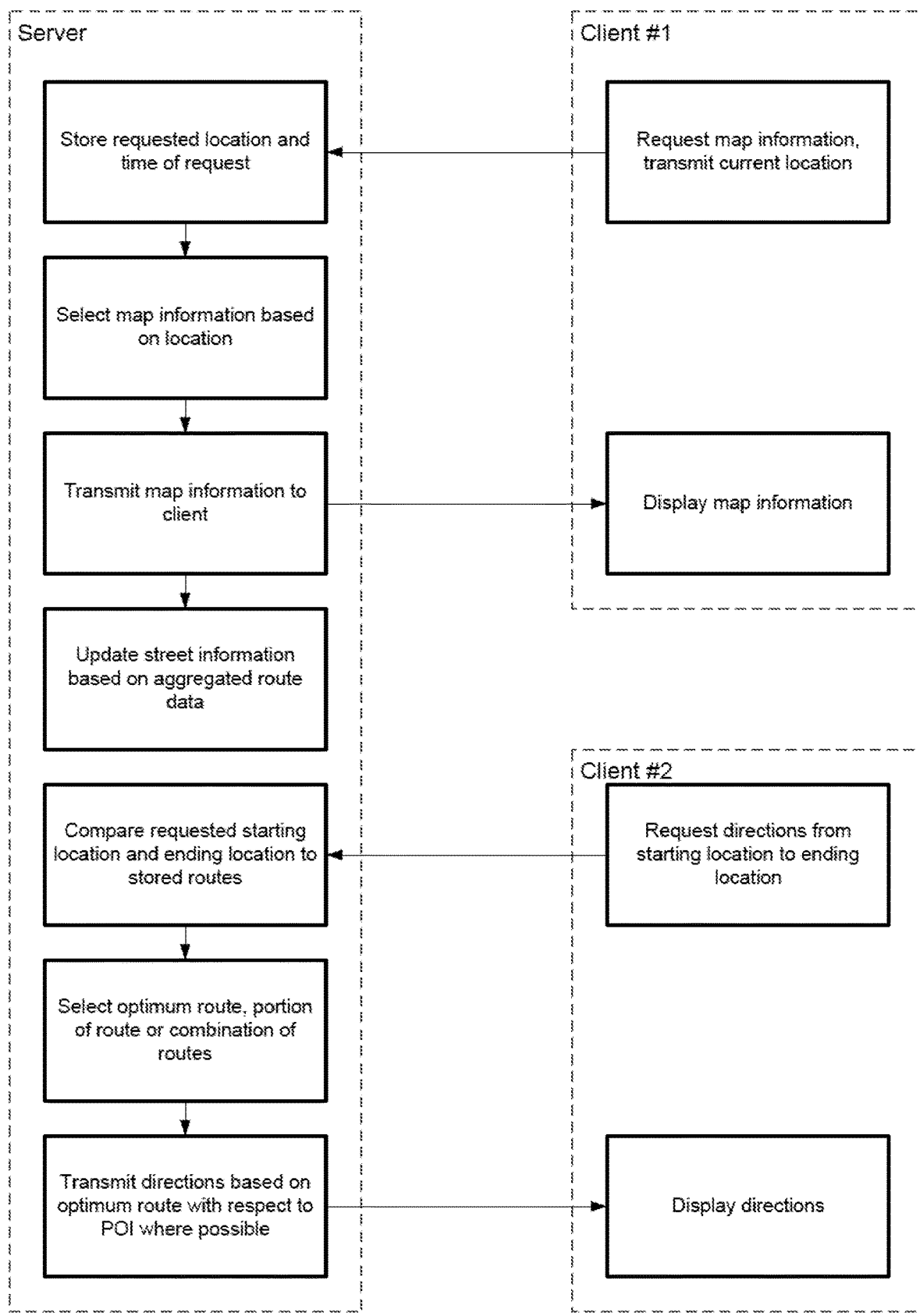
FIG. 9 is a flow chart in accordance with an aspect of the invention.

In addition to the operations illustrated in FIG. 9, various operations in accordance with a variety of aspects of the invention will now be described. It should be understood that the following operations do not have to be performed in the precise order described below. Rather, various steps can be handled in reverse order or simultaneously.

Route database 250 contains routes taken by users. In one aspect of the system and method, the route information is provided by mobile devices. One manner in which a mobile device 150 may provide its route information to the server is by periodically transmitting its geographic location. As noted above, this information may be provided by a dedicated program whose sole purpose is to upload its route to the route database 250.

However, advantages may be obtained when the information is transmitted as part of another application. For example, mobile device 150 may be a cell phone with a GPS receiver 155, and the instructions 153 may include mapping software such as Google Maps for Mobile.

For example, the user may want his or her cell phone to display a map that moves as the device moves. As the user travels the mapping software may periodically transmit the user's location, as detected by the GPS receiver 155, to server 110. A cell phone may also transmit the cell phone's current latitude and longitude by triangulating signals from cell phone towers.

When server 110 receives a request for map information associated with a particular geographic location, the server transmits information such as the map tile 272 that corresponds with the location. The server may also transmit surrounding tiles as well. Alternatively, the map information may include other information associated with a map as well (by way of example only, street locations, street names, turns, POI, etc.). The mapping software 153 renders the tiles on display 160 of the mobile device 150, thus allowing a user to view a map that moves as the device moves. When the mobile device changes location, the new location is uploaded and new tiles, if necessary, are downloaded and displayed.

The route information stored in database 250 may be compiled from mobile devices' requests for maps. By way of example only, the server 110 may store a set of all or a portion the locations sent by mobile device 150 when the device requested a map tile. The order in which the locations were requested would also be stored.

FIG. 3 illustrates a data table storing routing information compiled from mobile device requests for maps. Each row represents a separate request.

The first column stores the requested location, which is presumably the location of the mobile device. The second column stores the date and time that the request was received, which is presumably the date and time when the mobile device was at the requested location.

The third column stores information for the purpose of determining whether the location/time information came from the same or different mobile devices (this prevents the database from confusing a location received from one device with a location received from another device). This information may be a unique number, such as a GUID, that is associated with a particular mobile device or its copy of the mobile mapping software. It may also comprise a randomly assigned number that is assigned when the first request is received, or a unique session identifier. Preferably, the information is stored with the user's permission, anonymously and with the purpose of assisting other users with directions.

Figure 4:
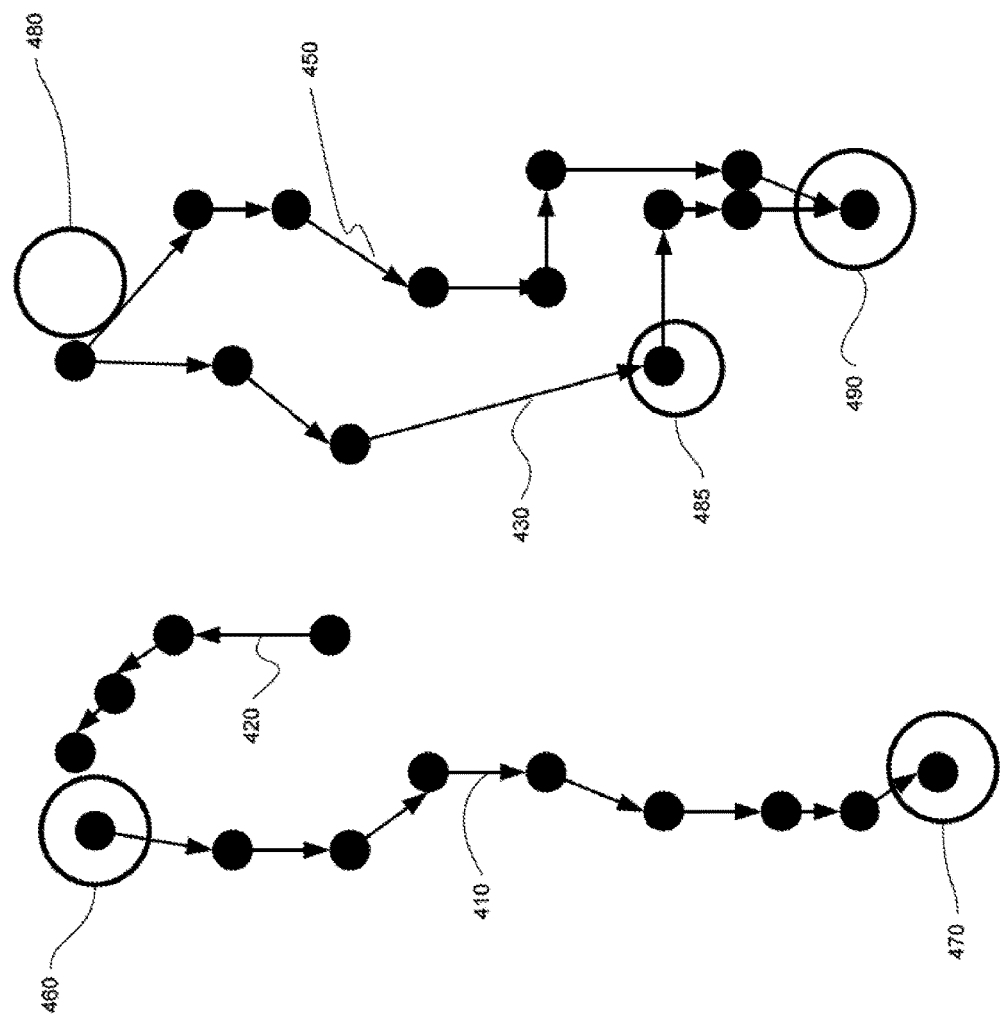
FIG. 4 is a model of route data in accordance with an aspect of the invention.

FIG. 4 graphically illustrates how sample location/time data may appear with respect to a map. Large circles 460, 470, 480, 485 and 490 represent different POIs having different locations. The smaller circles (i.e., in strings 410, 420, 430 and 450) represent a mobile device's request for map information at a particular location. The relative locations of the circles within the drawing are intended to be representative of the relative geographic locations of the POI and the requests. The arrows indicate the order in which the locations were received, i.e., the arrow from one request points to the next request.

Although the system and method are not limited to any particular manner of receiving or storing the route information, each individual collection of data 410, 420, 430 and 450 shall be referred to as a route for ease of reference. Similarly, unless otherwise noted below, it will be assumed that each route 410, 420, 430 and 450 was provided by a different mobile device or by the same mobile device in non-overlapping time periods. It will be understood that the scale, quantity and location of actual data in accordance with the invention may be quite different than that shown in FIG. 4. FIG. 4, along with the other sample data set forth herein, is intended to be illustrative only.

Many of the sample routes shown in FIG. 4 begin and end at POI 470 stored in map database 274. For example, route 410 begins at POI 460 and ends at POI 470. Other routes may not begin at a POI, but rather near a POI such as routes 430 and 450 that begin near POI 480.

Yet other routes may have beginning and ending points that do not start or terminate at or near POI, such as route 420 which does not start particularly near any POI stored in the database. Such a route may begin at a small private residence that is not associated with a landmark of interest to other users of the map database and, thus, never uploaded.

Some routes may begin and end at the same points (or at least near to one another), but take different paths along the way, such as routes 430 and 450 that start near POI 480 and end at POI 490. This may reflect two different users taking different streets in spite of the fact that they started and ended at the same locations.

In addition to a table data structure such as that shown in FIG. 3, routes may be received and stored in any number of ways. For example, in addition to storing the routes as a collection of time-stamped latitude/longitude positions, the system and method may also determine whether the time-stamped latitude/longitude positions correspond with streets stored in map database 270. If the system determines that a collection of GPS points sufficiently correlates with streets, the route may alternatively or additionally be stored as turns, e.g., "turn Right on Main Street (at 10:00), then Left on Second Street (at 10:04)." The route data may also be transmitted by the mobile devices in such a format. Yet further, the route may also be expressed as vectors or parameters defining one or more best fitting curves.

When a user seeks directions, the route information may be used. For the purpose of illustration, it will be assumed that mobile device 170 is requesting directions from one location to another.

In one aspect, the system and method searches route database 250 for a pre-stored route having a beginning and ending point that correlates with the beginning and ending point provided by the user requesting the directions.

For example, mobile device 170 may request directions from POI 460 to POI 470 (FIG. 4). The user may phrase the request in terms of POI rather than addresses, such as "City Hall in City X" as the start and "Y Temple in City Z" as the destination. The system and method searches its database for a pre-stored route matching the requested start and destination and, if found, selects that route. For example, if the name of POI 460 is "City Hall" and the POI is in City X, and if the name of POI 470 is "Y Temple" and the POI is in City Z, then the system and method would select route 410 in response to the user's request.

Routing between POI is particularly advantageous in rural areas lacking complete map data. In such areas, the map data 270 may not include the street numbers or street names of intended destinations; potentially the map data may not even be aware of the street, let alone its name. However, by allowing the user to route between POI, the system and method routes the user to a point where they need only determine the destination's location relative to the nearest landmark.

In one aspect of the invention, the turns are expressed where possible in terms of POI. For example, as shown in FIG. 4, route 430 passes through or near POI 485. For purposes of illustration, it will be assumed that POI 485 is a cinema with the name "Star Cinema". When the mobile device 170 approaches POI 485, the system and method may provide instructions such as "turn left at Star Cinema" rather than "turn left onto Second Street." POI-based turn instructions are particularly advantageous in areas where street names are missing from the database.

Figure 5:
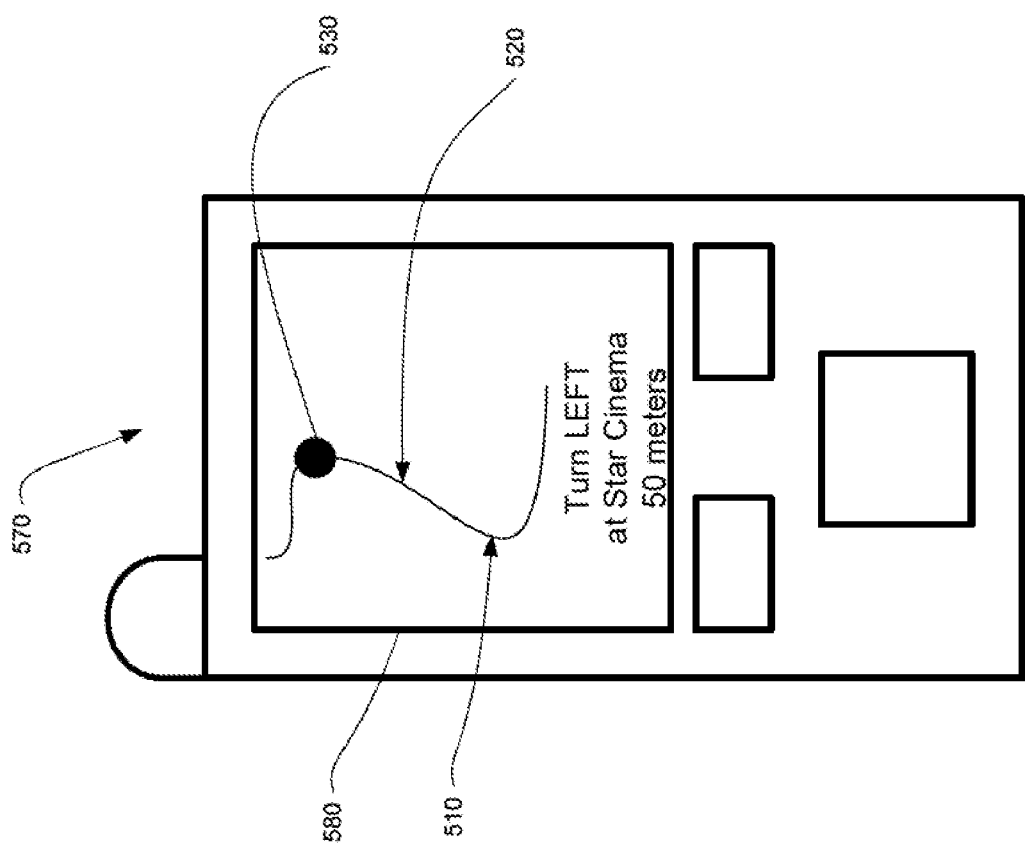
FIG. 5 is a screen shot of a mobile device in accordance with an aspect of the invention.

Moreover, if the client device requesting the directions is a mobile device capable of transmitting its location, the turns may be displayed one at a time as the user approaches them. A screen shot of such a system and method is shown in FIG. 5, where directions 510 are displayed on display 580 of cell phone 570. The device may also render a scaled representation of route 520 along with the device's current location 530 on the route.

If the map database 270 stores street names and addresses for the relevant area, the starting and ending points may be defined by street name and address as well.

Requests for directions, and the directions provided in response, may also be expressed in combinations of street names and POI. For example, the system and method may also determine, either when the route was uploaded or after the request for the directions, whether route 410 corresponds with known streets. If so, the directions may be provided in terms of street names and turns on streets.

In certain circumstances, there may be no street or POI associated with a portion of the route. In that regard, the system and method may transmit instructions to the mobile device 170 with generic instructions without regard to street names or POI, such as "bear Right in 100 feet".

Preferably, the system and method aggregates the route information that is uploaded from mobile devices in order to select the optimum route in response to a request for directions. For example, when a user requests directions, there may be more than one possible route between the desired starting and ending points. As shown in FIG. 4, routes 430 and 450 both begin and end at the same location.

One method of optimizing route selection is to select the route that is the fastest. For example, if route 430 was traversed faster than route 450, route 430 would be selected.

Another method of optimizing the route selection is to select the most popular route. For example, assume 100 people have uploaded a route that is identical to or nearly identical to route 430. Further assume that 1,000 people have uploaded a route that is identical to or nearly identical to route 450. In that case, the system and method may select route 450 over route 430 even if route 430 is faster.

A route may be faster yet unpopular for many reasons. For example, it may be easy to get lost when traveling on the route, it may contain small alleys that are difficult for middle to large sized cars to navigate, or it may traverse one or more high crime areas. Therefore, even if the route is faster, it may be less appealing to most travelers.

Popularity may also be chosen so as to filter particular routes. For example, if route 430 was only taken by two travelers between POI 480 and POI 490, it may not be popular enough to recommend to other users. However, once a sufficient number of mobile devices upload route 430, it may be added to the list of recommendable routes.

The foregoing factors for selecting optimal directions are not mutually exclusive. For example, the route that provides the best balance between popularity and speed may be selected over both unpopular fast routes and slow popular routes.

The foregoing factors may be used in combination with additional factors as well. For example, rather than picking the fastest route, the system and method may select the route that is the fastest for that particular time of day. Route 430 may be faster than route 450 except during the morning rush hour. In that regard, the time of the request may also be used to select the route, i.e., if the uploaded information indicates that route 450 is slower than route 430 except in the morning, then route 430 will be selected over route 450 unless the request comes in the morning.

In another aspect of the system and method, the user is presented with choices that may affect the selected route. For example, the user may transmit (in response to a prompt or otherwise) that it prefers speed over popularity. The selected routes would then be chosen with the user's preference in mind.

In yet another aspect of the system and method, routes will be joined together to determine the best directions to be provided to the user. For example, one user may have uploaded a route from POI 480 to POI 485, and another user may have uploaded a route from POI 485 to POI 490, but no user may have uploaded a route from POI 480 to POI 490. In that regard, when the system has insufficient route data to route from one POI to another, the system may search for routes that may be strung together and transparently present the two (or more) routes as a single route to the user.

Similarly, the system may select and present less than a complete uploaded route to the user. For example, if a user uploaded route 430 from POI 480 to POI 490 that passed through POI 485, and another user is seeking directions from POI 480 to POI 485, the system and method may select and transmit only that portion of route 430 that corresponds with route 430 between POI 480 and 485.

Figure 6:
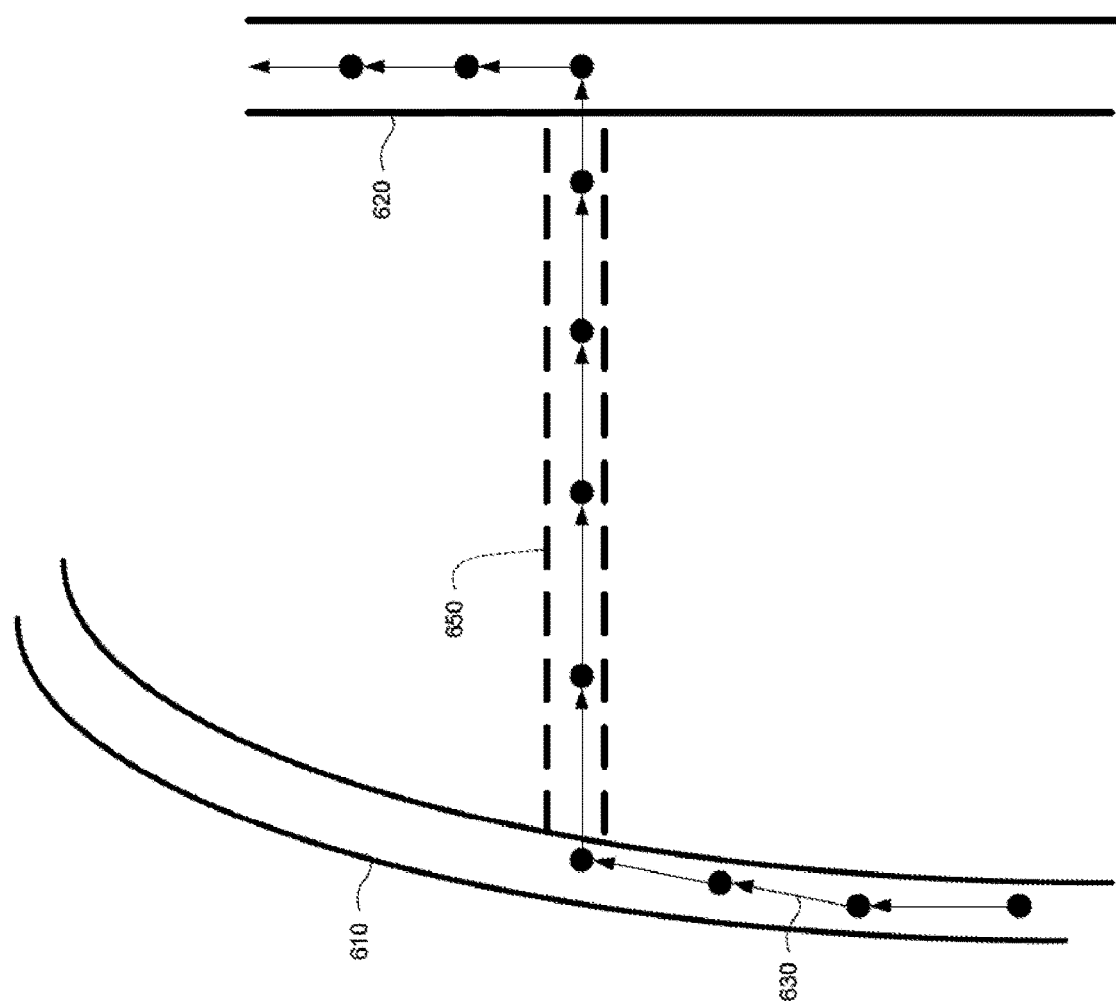
FIG. 6 is a functional diagram of route data relative to a street in accordance with an aspect of the invention.

A further aspect of the system and method provides for determining and modifying map data based on the uploaded routes. For example, FIG. 6 illustrates a case where only two streets 610 and 620 are known to map database 270 to be in a particular neighborhood. However, an analysis of uploaded route data 630 indicates that many users turn off of street 610, travel in an area where no street is believed to exist, and then turn onto street 620. If so, such route data 630 would appear to indicate that a street 650 exists between the two roads. Accordingly, provided that the route data is deemed to be sufficient, server 110 may automatically add street 650 to street information 276.

Alternatively, server 110 may generate a report indicating that a street 650 may be present. The potential street's existence could then be investigated and verified by a person before its inclusion in the map database. Indeed, such reports may be automatically generated whenever uploaded route data contradicts the information in the map database.

Figure 7:
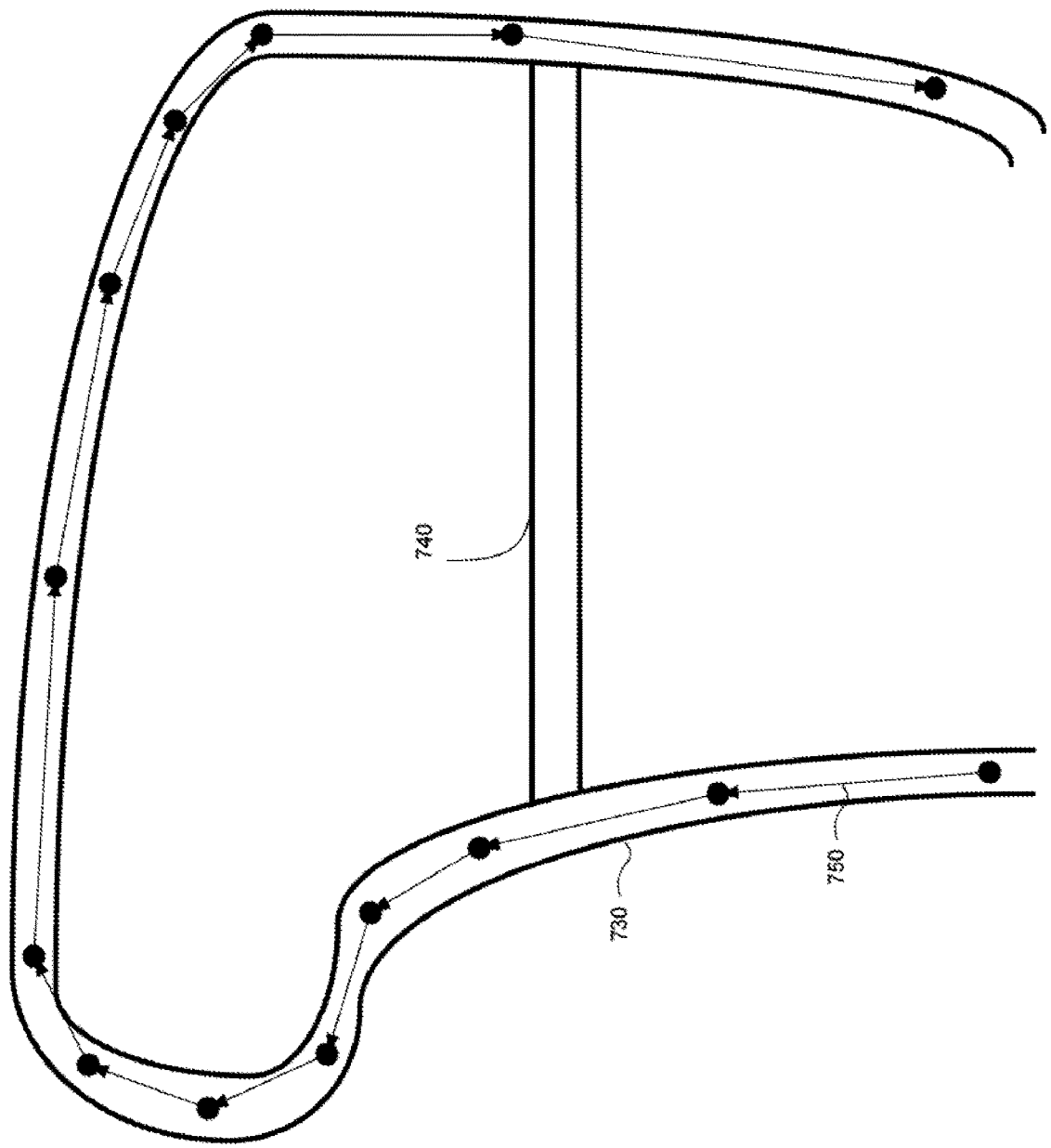
FIG. 7 is a functional diagram of route data relative to another street in accordance with an aspect of the invention.

Similarly, the uploaded route data may be used to remove streets from recommended directions if uploaded route information indicates that travelers seem to avoid the street. As shown in FIG. 7, users traversing on street 730 would appear to save time if they turned on street 740. If an analysis of the route data indicated that many users traversed street 730 and relatively no users traversed street 740, the system and method may conclude that the street either no longer exists or is otherwise unavailable due to construction or the like. In either case, server 110 may either remove street 740 from the map database 270 or cease including street 740 in its recommended directions.

Figure 8:
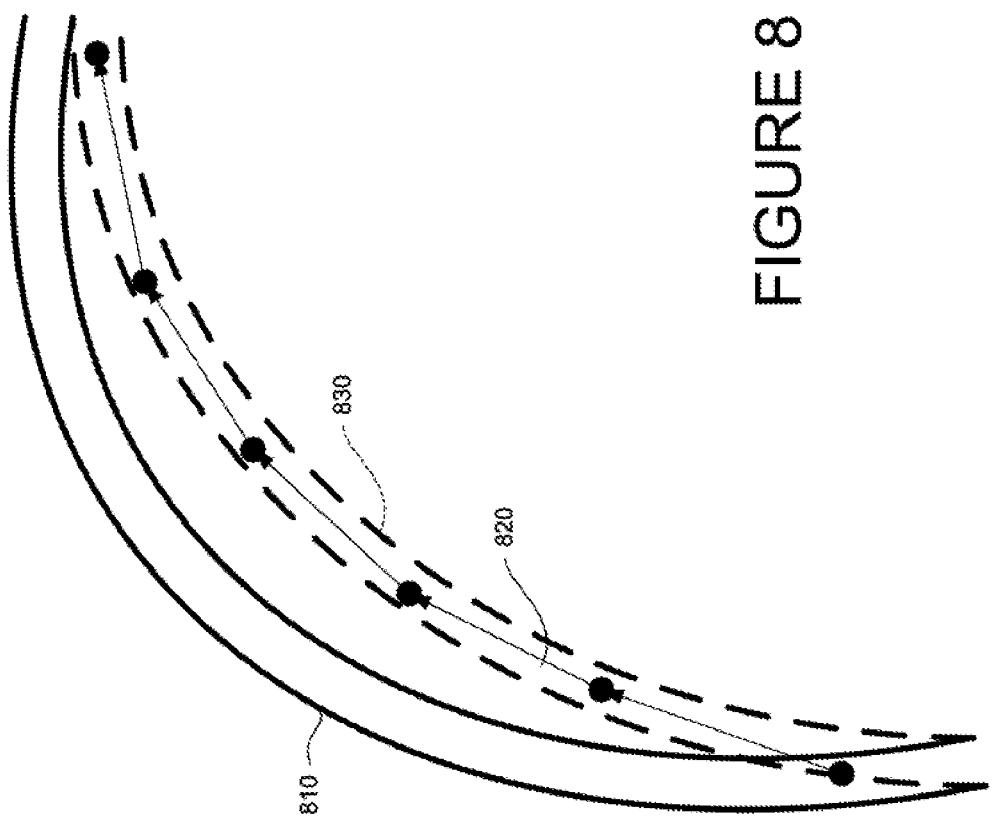
FIG. 8 is a functional diagram of route data relative to yet another street in accordance with an aspect of the invention.

The uploaded data may also be used to update the characteristics of streets. As shown in FIG. 8, routes may be used to update map data when uploaded routes 820 routinely indicate that the actual location of the road 830 is different than the location of the road 810 stored in the map database. They may also be used to change other stored characteristics of streets such as whether the street is one-way or two-way and the typical speed of the street. The uploaded routes may be also be used to provide live or historical traffic information.

The system and method may also be used in connection with transportation systems other than cars. For example, it may be used to upload and suggest routes including trains, particularly when a route uses a combination of automobiles and trains (such as a user parking their car at a train station). Preferably, the system would check uploaded routes against known train tracks, and indicate whether an uploaded route likely comprised, at least partially comprised, travel on a train.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will further be understood that many of the foregoing references to businesses and locations are fictional and for illustration purposes only.

The invention claimed is:

1. A method comprising:
   receiving, from a user, a request for directions from a starting location to an ending location;
   filtering candidate routes between the starting location and the ending location based on popularity;
   determining, with one or more processors at least a first route and a second route, each of the first route and the second route having one or more associated characteristics, wherein the first route and the second route each passed through the filtering based on having at least a threshold level of popularity;
   providing to the user an option for selecting a route from at least the first route and the second route based on the associated characteristics;
   receiving, through an interface, user input selecting one of the first route or the second route;
   providing for display turn-by-turn directions along the selected route; and
   providing live traffic information along the selected route.

2. The method of claim 1, wherein the characteristics comprise an expected time to traverse the route.

3. The method of claim 2, wherein the expected time to traverse the route is updated based on a time of day.

4. The method of claim 1, wherein the characteristics comprise a popularity of the route.

5. The method of claim 1, wherein each of the first route and the second route are optimized based on different types of associated characteristics.

6. The method of claim 5, wherein the first route is optimized based on time and the second route is optimized based on popularity.

7. The method of claim 1, wherein the request for directions identifies the ending location based on a point of interest.

8. A system comprising:
   memory; and
   one or more processors in communication with the memory, the one or more processors configured to:
   receive, from a user, a request for directions from a starting location to an ending location;
   filter candidate routes between the starting location and the ending location based on popularity;
   determine at least a first route and a second route, each of the first route and the second route having one or more associated characteristics, wherein the first route and the second route each passed through the filter based on having at least a threshold level of popularity;
   provide to the user an option for selecting a route from at least the first route and the second route based on the associated characteristics;
   receive user input selecting one of the first route or the second route;
   provide for display turn-by-turn directions along the selected route; and
   providing live traffic information along the selected route.

9. The system of claim 8, wherein the characteristics comprise an expected time to traverse the route.

10. The system of claim 9, wherein the expected time to traverse the route is updated based on a time of day.

11. The system of claim 8, wherein the characteristics comprise a popularity of the route.

12. The system of claim 8, wherein each of the first route and the second route are optimized based on different types of associated characteristics.

13. The system of claim 12, wherein the first route is optimized based on time and the second route is optimized based on popularity.

14. The system of claim 8, wherein the request for directions identifies the ending location based on a point of interest.

15. A non-transitory computer-readable medium storing instructions executable by one or more processors for performing a method comprising:
   receiving, from a user, a request for directions from a starting location to an ending location;
   filtering candidate routes between the starting location and the ending location based on popularity;
   determining at least a first route and a second route, each of the first route and the second route having one or more associated characteristics, wherein the first route and the second route each passed through the filtering based on having at least a threshold level of popularity;
   providing to the user an option for selecting a route from at least the first route and the second route based on the associated characteristics;
   receiving user input selecting one of the first route or the second route;
   providing for display turn-by-turn directions along the selected route; and
   providing live traffic information along the selected route.

16. The non-transitory computer-readable medium of claim 15, wherein the characteristics comprise an expected time to traverse the route.

17. The non-transitory computer-readable medium of claim 16, wherein the expected time to traverse the route is updated based on a time of day.

18. The non-transitory computer-readable medium of claim 15, wherein the characteristics comprise a popularity of the route.

19. The method of claim 1, further comprising:
   providing, through an interface, an option for selecting a transportation system other than cars; and
   generating a suggested route for the transportation system.

* * * * *